Aug. 7, 1956  W. FRITSCH  2,757,685
PRESSURE COOKERS AND THE LIKE
Original Filed May 20, 1952
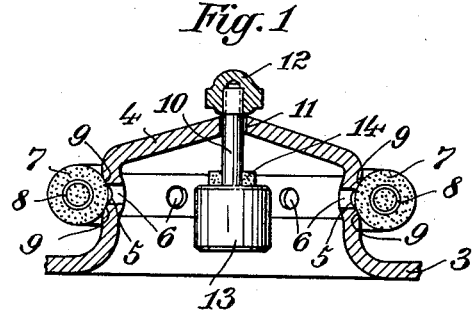
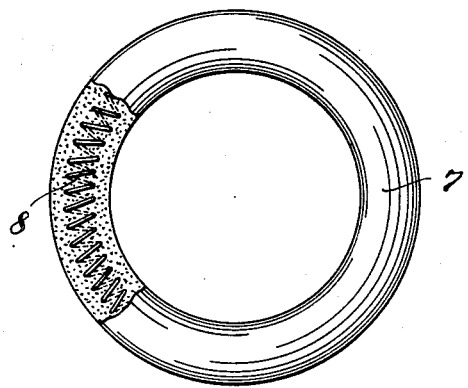
Inventor:
WILLY FRITSCH
BY:

United States Patent Office 2,757,685
Patented Aug. 7, 1956

2,757,685

PRESSURE COOKERS AND THE LIKE

Willy Fritsch, Mettmann, Rhineland, Germany

Original application May 20, 1952, Serial No. 288,901. Divided and this application October 27, 1953, Serial No. 388,569

Claims priority, application Germany May 21, 1951

8 Claims. (Cl. 137—525)

The present invention relates to pressure cookers and the like.

More particularly, the present invention relates to the combination of a means for visually indicating the pressure within a pressure cooker and the like with a safety means for limiting the pressure within a pressure cooker or the like and for giving a visual and aural indication that the upper limit of pressure within the cooker or the like has been reached.

The present application is a division of co-pending application Serial No. 288,901, filed May 20, 1952, and entitled "Pressure Cooker."

One of the objects of the present invention is to provide an exceedingly simple means for visually indicating the pressure within a pressure cooker or the like.

Another object of the present invention is to provide a visual pressure indicating means capable of being easily adapted to operate through different pressure ranges.

A further object of the present invention is to provide an exceedingly simple safety release for releasing the pressure in a pressure cooker or the like when this pressure reaches a predetermined limit.

An additional object of the present invention is to provide a safety means which will not become stopped up during operation.

Still another object of the present invention is to provide such a safety release with a resilient means which is capable of maintaining its resiliency for a long period of time and which will not become corroded or otherwise deteriorate during use of the apparatus.

A still further object of the present invention is to provide a safety release which is capable of giving an aural indication that the upper limiting pressure of the cooker or the like has been reached.

With the above objects in view, the present invention mainly consists of a pressure cooker provided at its cover or at some other suitable location with a top wall portion and a side wall portion extending downwardly from the periphery of the top wall portion, these wall portions having an outer surface adapted to form part of the outside and an inner surface adapted to define part of the inner space of a pressure cooker or the like, and these top and side wall portions respectively being formed with a top opening and a side opening. A rod extends freely through the top opening and has spaced parts respectively located on opposite sides of the top wall portion, and a pair of members are respectively fixed to the spaced parts of the rod and are larger than the top opening to limit movement of the rod in opposite direction through the top opening, these members and rod having a predetermined weight urging one of the members against the outer surface of the top wall portion over the top opening when the pressure in the pressure cooker is not substantially above atmospheric pressure and the other of these members being adapted to be acted on by pressure in the cooker or the like to raise the members and rod so that the distance of the said one member above the top wall portion gives a visual indication of the pressure within the cooker or the like. A resilient means engages the outer surface of the side wall portion with a predetermined pressure and covers the side opening so that when the pressure in the cooker or the like exceeds the predetermined pressure, the resilient means moves at least partly away from the outer surface of the side wall portion to provide an escape to the atmosphere, so that the resilient means cooperates with the side opening to provide a safety release for the pressure within the cooker or the like and to provide an upper limit to the force acting on the rod and the members connected thereto.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a fragmentary, sectional, elevational view of the top central portion of a cover of a pressure cooker having the structure of the invention; and Fig. 2 is a partly sectional top plan view of a resilient ring shown in Fig. 1.

Referring now to the drawings, it will be seen that the pressure cooker cover 3 is provided in its central portion with a hollow dome-shaped knob 4 which is provided with the apparatus of the invention. As is apparent from Fig. 1, this hollow dome-shaped knob 4 is provided with a substantially cylindrical side wall portion extending downwardly from the periphery of a circular and slightly conical top wall portion.

The side wall portion is formed in its outer face with an annular groove 5 and is further formed with a plurality of side openings 6 annularly spaced from each other, being distributed about the groove 5, and being located within the confines thereof. Thus, the openings 6 serve to maintain the interior of the pressure cooker in communication with the annular groove 5.

A resilient ring 7 made of rubber or the like is located about the outer surface of the side wall portion and forms a resilient means covering the side openings 6 to form a safety release as described below. The resilient rubber ring 7 is of a circular cross section having a diameter substantially larger than the width of the annular groove 5 so that the ring 7 bears against the opposite side edges 9 of the groove 5 with a predetermined force and is spaced from all parts of groove 5 except the opposite side edges 9 thereof so as to provide an annular space between the ring 7 and openings 6. A steel coil spring 8 is embedded within the ring 7, during molding of the latter, so that the resiliency of the ring 7 is maintained in full force over a long period of time, and it will be seen that no part of the members 7 and 8 are subject to corrosion or other deleterious phenomena. Furthermore, there are no difficulties with respect to maintaining the spring 8 in its position with respect to ring 7 because this spring 8 is embedded within the ring 7. The ring 7 presses with a predetermined resilient force against the side edges 9 of groove 5 so that when the pressure within the cooker exceeds this predetermined force the pressure will move the ring 7 at least partly away from one of the edges 9, so that the ring 7 cooperates with the openings 6 to provide a safety release, whereas while the pressure within the cooker is below that with which the ring 7 bears against the edges 9 the interior of the cooker is effectively sealed by the ring 7. Furthermore, the provision of a plurality of openings 6 guarantees that the safety release will operate properly even if some of these openings become stopped up, and moreover the operation is such that the escaping steam or the like will unstop any blocked openings 6, so that the efficient operation of the safety release is automatically assured. Also, when the steam escapes between ring 7 and a part of an edge 9, a whistling sound is produced to provide an aural indication that the upper pressure has been reached, and also the escaping steam gives a visual indication that the upper pressure limit has been reached.

The structure for indicating the pressure within the pressure cooker includes the opening 11 formed in the top wall portion of the hollow knob 4, and a rod 10 extending freely through this opening 11 and having spaced parts located respectively on opposite sides of the top wall 4. A pair of members 12 and 13 are respectively fixed to these spaced parts of the rod 10, the upper member 12 as well as the lower member 13 being larger than the opening 11 and the upper member 12 serving as an indicating member. Thus, the weight of members 10, 12 and 13 urges the upper member 12 over the opening 11 into engagement with the outer surface of knob 4, as shown in Fig. 1, when the pressure within the cooker is not substantially above atmospheric pressure, whereas the pressure within the cooker acts on the relatively large bottom face of member 13 to raise the latter together with members 10 and 12 as the pressure within the cooker increases so that the distance of member 12 above the top surface of the pressure cooker gives a visual indication of the pressure within the cooker. If desired, suitable gradations may be provided along the rod 10 between members 12 and 13 to cooperate with the top rim of opening 11 to indicate the extent to which member 12 has moved up. A sealing ring 14 is located about the rod 10 next to the top surface of member 13 and seals the opening 11 when the member 13 is located closely adjacent to opening 11.

The member 13 is removably connected to the rod 10, as by being screwed thereto, so that similar members 13 of different weights may be connected to the rod 10 and in this way it is an exceedingly simple matter to adjust the apparatus to be used at high pressures or at relatively low pressures. Of course, when changing the member 13, it is also necessary to change the ring 7 for a ring having a correspondingly greater or smaller force, because there is a close cooperation between the pressure indicating structure and the safety release structure. For example, if the structure is designed to cause sealing ring 14 to close opening 11 when the pressure within the cooker is one corresponding to a temperature of 102° C., then the force of ring 7 is such that it will be separated from part of an edge 9 when the pressure within the cooker is one which corresponds to a temperature of 105–107° C., for example, so that the safety release apparatus will prevent the pressure within the cooker from building up excessively to avoid serious accidents. With a structure having these characteristics, the cooker will operate to cook food at a temperature of between 102 and 105° C. It is evident, however, that by proper choice of ring 7 and weight 13 the apparatus may operate within any desired range the only requirement being that the force of ring 7 against the edges 9 must always be slightly greater than the force required to raise the sealing ring 14 into sealing relationship with the opening 11.

It will be understood that each of the elements described above, or two or more together, may also find a useful application in other types of pressure cookers differing from the types described above.

While the invention has been illustrated and described as embodied in pressure indicating and safety release apparatus for pressure cookers and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the stand point of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. For use in a pressure cooker or the like, in combination, a top wall portion and a side wall portion extending downwardly from the periphery of said top wall portion, said wall portions having an outer surface adapted to form part of the outside and an inner surface adapted to define part of the inner space of a pressure cooker or the like, said top and side wall portions respectively being formed with a top opening and a side opening; a rod extending freely through said top opening and having spaced parts respectively located on opposite sides of said top wall portion; a pair of members respectively fixed to said spaced parts of said rod and being larger than said top opening to limit movement of said rod in opposite directions through said top opening, said members and rod having a predetermined weight urging one of said members against the outer surface of said top wall portion over said top opening when the pressure in the pressure cooker is not substantially above atmospheric pressure and the other of said members being adapted to be acted on by pressure in the cooker or the like to raise said members and rod so that the distance of said one member above said top wall portion gives a visual indication of the pressure within the cooker or the like; and resilient means engaging said outer surface of said side wall portion with a predetermined pressure and covering said side opening so that when the pressure in the cooker or the like exceeds said predetermined pressure said resilient means moves at least partly away from said outer surface of said side wall portion to provide an escape to the atmosphere, so that said resilient means cooperates with said side opening to provide a safety release for the pressure within the cooker or the like and to provide an upper limit to the force acting on said rod and members connected thereto.

2. For use in a pressure cooker or the like, in combination, a top wall portion and a side wall portion extending downwardly from the periphery of said top wall portion, said wall portions having an outer surface adapted to form part of the outside and an inner surface adapted to define part of the inner space of a pressure cooker or the like, said top and side wall portions respectively being formed with a top opening and a side opening; a rod extending freely through said top opening and having spaced parts respectively located on opposite sides of said top wall portion; a pair of members respectively fixed to said spaced parts of said rod and being larger than said top opening to limit movement of said rod in opposite directions through said top opening, said members and rod having a predetermined weight urging one of said members against the outer surface of said top wall portion over said top opening when the pressure in the pressure cooker is not substantially above atmospheric pressure and the other of said members being adapted to be acted on by pressure in the cooker or the like to raise said members and rod so that the distance of said one member above said top wall portion gives a visual indication of the pressure within the cooker or the like, other member being removably connected to said rod so as to be replaceable by similar members of different sizes and weights; and resilient means engaging said outer surface of said side wall portion with a predetermined pressure and covering said side opening so that when the pressure in the cooker or the like exceeds said predetermined pressure said resilient means moves at least partly away from said outer surface of said side wall portion to provide an escape to the atmosphere, so that said resilient means cooperates with said side opening to provide a safety release for the pressure within the cooker or the like and to provide an upper limit to the force acting on said rod and members connected thereto.

3. For use in a pressure cooker or the like, in combination, a top wall portion and a side wall portion extending downwardly from the periphery of said top wall portion, said wall portions having an outer surface adapted to form part of the outside and an inner surface adapted to define part of the inner space of a pressure cooker or the like, said top and side wall portions respectively being formed with a top opening and a side opening; a rod extending freely through said top opening and having spaced parts respectively located on opposite sides of said top wall portion; a pair of members respectively fixed to said spaced parts of said rod and being larger than said top opening to limit movement of said rod in opposite directions through said top opening, said members and rod having a predetermined weight urging one of said members against the outer surface of said top wall portion over said top opening when the pressure in the pressure cooker is not substantially above atmospheric pressure and the other of said members being adapted to be acted on by pressure in the cooker or the like to raise said members and rod so that the distance of said one member above said top wall portion gives a visual indication of the pressure within the cooker or the like, said other member having a top face directed toward said inner surface of said top wall portion; a sealing ring located about said rod adjacent to said top face of said other member to seal said top opening when said other member becomes located closely adjacent thereto; and resilient means engaging said outer surface of said side wall portion with a predetermined pressure and covering said side opening so that when the pressure in the cooker or the like exceeds said predetermined pressure said resilient means moves at least partly away from said outer surface of said side wall portion to provide an escape to the atmosphere, so that said resilient means cooperates with said side opening to provide a safety release for the pressure within the cooker or the like and to provide an upper limit to the force acting on said rod and members connected thereto.

4. For use in a pressure cooker or the like in, combination, a top wall portion and a side wall portion extending downwardly from the periphery of said top wall portion, said wall portions having an outer surface adapted to form part of the outside and an inner surface adapted to define part of the inner space of a pressure cooker or the like, said top and side wall portions respectively being formed with a top opening and a side opening; a rod extending freely through said top opening and having spaced parts respectively located on opposite sides of said top wall portion; a pair of members respectively fixed to said spaced parts of said rod and being larger than said top opening to limit movement of said rod in opposite directions through said top opening, said members and rod having a predetermined weight urging one of said members against the outer surface of said top wall portion over said top opening when the pressure in the pressure cooker is not substantially above atmospheric pressure and the other of said members being adapted to be acted on by pressure in the cooker or the like to raise said members and rod so that the distance of said one member above said top wall portion gives a visual indication of the pressure within the cooker or the like; and a resilient ring engaging and extending about said outer surface of said side wall portion with a predetermined pressure and covering said side opening so that when the pressure in the cooker or the like exceeds said predetermined pressure said ring moves at least partly away from said outer surface of said side wall portion to provide an escape to the atmosphere, so that said ring cooperates with said side opening to provide a safety release for the pressure within the cooker or the like and to provide an upper limit to the force acting on said rod and members connected thereto.

5. For use in a pressure cooker or the like, in combination, a top wall portion having a circular periphery and a cylindrical side wall portion extending downwardly from the periphery of said top wall portion, said wall portions having an outer surface adapted to form part of the outside and an inner surface adapted to define part of the inner space of a pressure cooker or the like, said top wall portion being formed with a top opening and said side wall portion being formed in its outer surface with an annular groove and with a plurality of annularly spaced side openings distributed about said annular groove and located within the confines thereof; a rod extending through said top opening and having spaced parts respectively located on opposite sides of said top wall portion; a pair of members respectively fixed to said spaced parts of said rod and being larger than said top opening to limit movement of said rod in opposite directions through said top opening, said members and rod having a predetermined weight urging one of said members against the outer surface of said top wall portion over said top opening when the pressure in the pressure cooker is not substantially above atmospheric pressure and the other of said members being adapted to be acted on by pressure in the cooker or the like to raise said members and rod so that the distance of said one member above said top wall portion gives a visual indication of the pressure within the cooker or the like; and a resilient rubber ring having a circular cross section of a diameter substantially larger than the width of said annular groove located about the latter and engaging said outer surface of said side wall portion at opposite side edges of said groove with a predetermined pressure to form in said groove an annular space between said side openings and ring so that when the pressure in the cooker or the like exceeds said predetermined pressure said ring moves at least partly away from at least one of said side edges of said groove to provide an escape to the atmosphere, so that said ring cooperates with said groove and side openings to provide a safety release for the pressure within the cooker or the like and to provide an upper limit to the force acting on said rod and members connected thereto.

6. For use in a pressure cooker or the like, in combination, a top wall portion having a circular periphery and a cylndrical side wall portion extending downwardly from the periphery of said top wall portion, said wall portions having an outer surface adapted to form part of the outside and an inner surface adapted to define part of the inner space of a pressure cooker or the like, said top wall portion being formed with a top opening and said side wall portion being formed in its outer surface with an annular groove and with a plurality of annularly spaced side openings distributed about said annular groove and located within the confines thereof; a rod extending through said top opening and having spaced parts respectively located on opposite sides of said top wall portion; a pair of members respectively fixed to said spaced parts of said rod and being larger than said top opening to limit movement of said rod in opposite directions through said top opening, said members and rod having a predetermined weight urging one of said members against the outer surface of said top wall portion over said top opening when the pressure in the pressure cooker is not substantially above atmospheric pressure and the other of said members being adapted to be acted on by pressure in the cooker or the like to raise said members and rod so that the distance of said one member above said top wall portion gives a visual indication of the pressure within the cooker or the like; a resilient rubber ring having a circular cross section of a diameter substantially larger than the width of said annular groove located about the latter and engaging said outer surface of said side wall portion at opposite side edges of said groove with a predetermined pressure to form in said groove an annular space between said side openings and ring so that when the pressure in the cooker or the like exceeds said predetermined pressure said ring moves at least partly away from at least one of said side edges of said groove to provide an escape to the atmosphere, so that said ring cooperates with said groove and side openings to provide a safety release for the pressure within the cooker or the like and to provide an upper limit to the force acting on said rod and members connected thereto; and an annular metallic coil spring embedded in said rubber ring.

7. For use in a pressure cooker or the like, in combination, a cover having a top wall portion and a side wall portion extending downwardly from the periphery of said top wall portion, said wall portions having an outer surface adapted to form part of the outside and an inner surface adapted to define part of the inner space of a pressure cooker or the like, said top and side wall portions respectively being formed with a top opening and a side opening; a rod extending freely through said top opening and having spaced parts respectively located on opposite sides of said top wall portion; a pair of members respectively fixed to said spaced parts of said rod and being larger than said top opening to limit movement of said rod in opposite directions through said top opening, said members and rod having a predetermined weight urging one of said members against the outer surface of said top wall portion over said top opening when the pressure in the pressure cooker is not substantially above atmospheric pressure and the other of said members being adapted to be acted on by pressure in the cooker or the like to raise said members and rod so that the distance of said one member above said top wall portion gives a visual indication of the pressure within the cooker or the like; and resilient means engaging said outer surface of said side wall portion with a predetermined pressure and covering said side opening so that when the pressure in the cooker or the like exceeds said predetermined pressure said resilient means moves at least partly away from said outer surface of said side wall portion to provide an escape to the atmosphere, so that said resilient means cooperates with said side opening to provide a safety release for the pressure within the cooker or the like and to provide an upper limit to the force acting on said rod and members connected thereto.

8. For use in a pressure cooker or the like, in combination, a cover having a dome-shaped knob provided with a top wall portion and a side wall portion extending downwardly from the periphery of said top wall portion, said wall portions having an outer surface adapted to form part of the outside and an inner surface adapted to define part of the inner space of a pressure cooker or the like, said top and side wall portions respectively being formed with a top opening and a side opening; a rod extending freely through said top opening and having spaced parts respectively located on opposite sides of said top wall portion; a pair of members respectively fixed to said spaced parts of said rod and being larger than said top opening to limit movement of said rod in opposite directions through said top opening, said members and rod having a predetermined weight urging one of said members against the outer surface of said top wall portion over said top opening when the pressure in the pressure cooker is not substantially above atmospheric pressure and the other of said members being adapted to be acted on by pressure in the cooker or the like to raise said members and rod so that the distance of said one member above said top wall portion gives a visual indication of the pressure within the cooker or the like; and resilient means engaging said outer surface of said side wall portion with a predetermined pressure and covering said side opening so that when the pressure in the cooker or the like exceeds said predetermined pressure said resilient means moves at least partly away from said outer surface of said side wall portion to provide an escape to the atmosphere, so that said resilient means cooperates with said side opening to provide a safety release for the pressure within the cooker or the like and to provide an upper limit to the force acting on said rod and members connected thereto.

References Cited in the file of this patent

UNITED STATES PATENTS

| 1,290,378 | Sibley | Jan. 7, 1919 |
| 1,369,249 | Kroupa | Feb. 22, 1921 |
| 1,371,669 | Davis | Mar. 15, 1921 |
| 2,403,691 | States | July 9, 1946 |

FOREIGN PATENTS

| 28,455 | Norway | Dec. 21, 1917 |
| 650,769 | Germany | Sept. 30, 1937 |
| 812,277 | Germany | Aug. 27, 1951 |